United States Patent
Ishii et al.

(10) Patent No.: US 7,203,178 B2
(45) Date of Patent: Apr. 10, 2007

(54) MULTIUSER INTERFERENCE CANCELLATION APPARATUS

(75) Inventors: Naoto Ishii, Tokyo (JP); Shousei Yoshida, Tokyo (JP)

(73) Assignee: NEC Corporation, Tokyo (JP)

( * ) Notice: Subject to any disclaimer, the term of this patent is extended or adjusted under 35 U.S.C. 154(b) by 1058 days.

(21) Appl. No.: 10/162,194

(22) Filed: Jun. 5, 2002

(65) Prior Publication Data

US 2002/0191580 A1     Dec. 19, 2002

(30) Foreign Application Priority Data

Jun. 13, 2001    (JP)    ............. 2001-177849

(51) Int. Cl.
*H04B 3/23* (2006.01)
*H04B 7/216* (2006.01)

(52) U.S. Cl. .............. 370/286; 370/342; 375/148
(58) Field of Classification Search ......... 370/286, 370/288, 289, 335, 342; 375/148, 285, 346, 375/347; 455/296

See application file for complete search history.

(56) References Cited

U.S. PATENT DOCUMENTS

| | | | |
|---|---|---|---|
| 6,600,729 B1 * | 7/2003 | Suzuki | 370/335 |
| 6,614,766 B1 * | 9/2003 | Seki et al. | 370/286 |
| 6,944,208 B2 * | 9/2005 | Miyoshi et al. | 375/148 |

FOREIGN PATENT DOCUMENTS

| | | |
|---|---|---|
| JP | 11-205286 A | 7/1999 |
| JP | H11-205286 A | 7/1999 |
| JP | 2001-16148 A | 1/2001 |
| KR | 1998-701743 A | 6/1998 |
| WO | WO 01/28107 A1 | 4/2001 |

OTHER PUBLICATIONS

Naoto Ishii, et al., "Development of a Parallel Multi-User Interference Canceller for W-CDMA", Communication Society Conference Papers, Institute of Electronics, Information and Communication Engineers, Aug. 16, 1999, 1, p. 251, B-5-16.

S. Marinkovic et al., "Space-Time Iterative and Multistage Receiver Structures for CDMA Mobile Communication Systems", VTC 2001 SPRING. IEEE VTS 53RD, Vehicular Technology Conference, (May 6-9, 2001), pp. 1799-1803 with Abstract.

* cited by examiner

*Primary Examiner*—Doris H. To
*Assistant Examiner*—Saba Tsegaye
(74) *Attorney, Agent, or Firm*—Sughrue Mion, PLLC

(57) ABSTRACT

A multiuser interference elimination apparatus in which, even in the second and other subsequent stages, adaptive updating of antenna weights can be performed and antenna weights can be generated with accuracy by using interference-canceled received signals. A multiplier performs gain correction by multiplying a symbol replica transmitted from the preceding stage by a coefficient $[1-(1-\alpha)^{m-1}]$, and an antenna signal regeneration section converts the gain-corrected symbol replica into antenna signals. Adders add the antenna signals converted by the antenna signal regeneration section to outputs from despread devices and output the addition results to an antenna weight adaptive updating section. The antenna weight adaptive updating section performs adaptive updating of antenna weights by using the addition results.

12 Claims, 8 Drawing Sheets

US 7,203,178 B2

MULTIUSER INTERFERENCE CANCELLATION APPARATUS

BACKGROUND OF THE INVENTION

1. Field of the Invention

The present invention relates to a multiuser interference cancellation apparatus and, more particularly, to a multiuser interference cancellation method which ensures improved demodulation characteristics in a code division multiple access (CDMA) system even if the number of users simultaneously gaining access to the system is large.

2. Description of the Prior Art

In a CDMA system, the problem of a deterioration in demodulation characteristics due to interference signal components becomes more serious with the increase in the number of users simultaneously gaining access to the system. A multiuser cancellation method has been studied as a method for ensuring improved demodulation characteristics even if the number of users simultaneously gaining access is increased.

Japanese Patent Laid-open No. 11-205286 discloses an error transmission type of multiuser time/space interference canceller which is a receiver having both two functions: the function of canceling interference due to an antenna directivity, and the function of canceling interference based on regeneration of interference replicas, and having improved ability to eliminate interference. This multiuser time/space interference canceller is of such a type that the increase in the number of pieces of hardware is comparatively small, and is therefore practical.

This multiuser time/space interference canceller will be described with reference to FIGS. 1, 6, and 7. FIG. 1 shows the configuration of this multiuser time/space interference canceller. As shown in FIG. 1, the multiuser time/space interference canceller is constituted by antennas 1-1 to 1-N, interference estimation units (IEUs) 2-1 to 2-K, 3-1 to 3-K, and 4-1 to 4-K, and adders 5-1 to 5-N, and 6-1 to 6-N. N (N: an integer larger than or equal to 1) represents the number of elementary antennas, and K (K: an integer larger than or equal to 1) represents the number of users.

Signals received by the antennas 1-1 to 1-N are input to the interference estimation units 2-1 to 2-K in the first stage. The interference estimation units 2-1 to 2-K output interference replicas and symbol replicas in correspondence with the user signals. The interference replicas are input to the adders 5-1 to 5-N, while the symbol replicas are transmitted to the interference estimation units 3-1 to 3-K in the second stage. The adders 5-1 to 5-N respectively subtract the interference replicas from the antenna received signals in correspondence with the antennas 1-1 to 1-N and output the subtraction results to the interference estimation units 3-1 to 3-K.

The interference estimation units 3-1 to 3-K in the second stage generate interference replicas and symbol replicas and output the interference replicas to the adders 6-1 to 6-N and the symbol replicas to the interference estimation units 4-1 to 4-K in the third stage, as do the interference estimation units 2-1 to 2-K in the first stage. The interference estimation units 4-1 to 4-K in the third stage output demodulated signals.

FIG. 6 shows the configuration of each of the interference estimation units 2-1 to 2-K in the first stage, and FIG. 7 shows the configuration of each of the interference estimation units 3-1 to 3-K, and 4-1 to 4-K in the subsequent stages. In each of the interference estimation units 2-1 to 2-K in the first stage having the configuration shown in FIG. 6, the antenna received signals are despread by despread means 111-1 to 111-N on a RAKE path basis to be converted into baseband signals. The despread signals are directivity-controlled by a beam former 112.

FIG. 4 shows details of the configuration of the beam former 112. Antenna weights are prepared with respect to each stage and each RAKE path. Antenna weights $w_{m,l,1}$ to $w_{m,l,N}$ are prepared with respect to the antenna received signals in the l-th path (l=1 to L) at the m-th stage (m=1 to M). The antenna weights are converted into the respective complex conjugates by complex conjugate generation means 51-1 to 51-N. The complex conjugates of the antenna weights and the antenna signals are multiplied together by multipliers 50-1 to 50-N, the multiplication results are input to an adder 52, and the result of combining by the adder 52 is obtained as an output from the beam former 112.

From the output from the beam former 112, a channel distortion is estimated by a channel estimation section 113. The estimated value is converted into the complex conjugate by a complex conjugate generation means 114. The output from the beam former 112 and the complex conjugate of the channel estimated value are multiplied together by a multiplier 115. An output from the multiplier 115 with respect to each RAKE path is input to a RAKE combining section 118. The RAKE combining section 118 generates a demodulated signal about which a hard decision is made by a hard decision means 119.

On the other hand, the outputs from the despread means 111-1 to 111-N are also input to an antenna weight adaptive updating section 117. The antenna weight adaptive updating section 117 performs incoming direction estimation based on the antenna received signals to obtain steering vectors with respect to incoming directions, and sets the steering vectors as antenna weights while normalizing them so that the beam gain (peak) is 1.

The antenna weight adaptive updating section 117 notifies the beam former 112 of the obtained antenna weights. An output from the hard decision means 119 is processed with respect to each path to generate interference replicas. A multiplier 123 multiplies the output from the hard decision means 119 by the output from the channel estimation section 113 and transmits a signal obtained as a symbol replica by this multiplication to the following stage. A multiplier 124 multiplies the multiplication result from the multiplier 123 by an interference suppression coefficient α and outputs the result of this multiplication to an antenna signal regeneration section 125.

FIG. 8 shows details of the configuration of the antenna signal regeneration section 125. Multipliers 160-1 to 160-N of the antenna signal regeneration section 125 regenerate antenna signals by multiplying the input signal by coefficients which are obtained by multiplying the antenna weights $w_{m,l,1}$ to $w_{m,l,N}$ by an antenna gain correction coefficient β=N. The signals obtained as antenna signals by conversion in the antenna signal regeneration section 125 are respread by respread means 126-1 to 126-N in correspondence with the antennas 1-1 to 1-N and are added together with respect to the RAKE paths by adders 127-1 to 127-N to generate interference replicas.

The interference estimation units 3-1 to 3-K will be described with reference to FIG. 7. In the arrangement shown in FIG. 7, components identical or corresponding to those shown in FIG. 6 are indicated by the same reference characters. Symbol replicas transmitted from the interference estimation units 2-1 to 2-K in the first stage and residue signals output from the adders 5-1 to 5-N shown in FIG. 1 are input to the interference estimation units 3-1 to 3-K in the second stage. The residue signals are despread by despread means 111-1 to 111-N and directivity-controlled by a beam former 112. As antenna weight coefficients used in the beam former 112, the values obtained by the interference estimation units 2-1 to 2-K in the first stage are used without being changed.

An adder 128 adds together an output from the beam former 112 and the results of multiplication performed by a multiplier 129, i.e., multiplication of the symbol replica transmitted from the preceding stage by a coefficient $[1-(1-\alpha)^{m-1}]$ determined by the interference suppression coefficient $\alpha$ and the stage number m. An output from the adder 128 is input to a channel estimation section 113. A channel estimated value is thereby obtained and is converted into the complex conjugate by a complex conjugate generation means 114. The output from the adder 128 and the complex conjugate of the channel estimated value are multiplied together by a multiplier 115. A RAKE combining section 118 combines outputs from the multipliers 115 obtained in correspondence with RAKE paths to obtain a demodulated signal. An output from a hard decision means 119 with respect to the output from the RAKE combininb section 118 and the channel estimated value output from the channel estimation section 113 are multiplied together by a multiplier 123 and the result of this multiplication is transmitted as a symbol replica to the following stage. This operation is the same as that in the arrangement shown in FIG. 6.

From the symbol replica output at the present time from the multiplier 123, the symbol replica transmitted from the preceding stage is subtracted by an adder 132, and the symbol replica difference output from the adder 132 is multiplied by the interference suppression coefficient $\alpha$ by a multiplier 124. An output from the multiplier 124 is converted into antenna signals by an antenna signal regeneration section 125. The regenerated antenna signals are respread by respread means 126-1 to 126-N and are added together by adders 127-1 to 127-N with respect to the RAKE paths to be transmitted as interference replicas to the adders 6-1 to 6-N shown in FIG. 1.

The interference estimation units 4-1 to 4-K do not perform interference replica regeneration. The output from the RAKE combininb section 118 shown in FIG. 7 is obtained as a demodulation result of each of the interference estimation units 4-1 to 4-k. The operation before the output from the RAKE combininb section 118 is the same as that in the interference estimation units 3-1 to 3-K in the second stage, and the description for it will not be repeated.

The above-described conventional apparatus for canceling multiuser interference has problems described below. The interference estimation units in the second and other subsequent stages are supplied with the residue signals and cannot use the antenna received signals. In the interference estimation units in the second and third stages, therefore, updating of antenna weights cannot be performed.

In the case where adaptive updating is used for generating antenna weights, the beam gain is not always equal to 1 and it is not possible to regenerate antenna signals accurate in level.

SUMMARY OF THE INVENTION

In view of the above-described problems, an object of the present invention is to provide a multiuser interference elimination apparatus in which, even in the second and other subsequent stages, adaptive updating of antenna weights can be performed and antenna weights can be generated with accuracy by using interference-canceled received signals.

To achieve the above-described object, according to one aspect of the present invention, there is provided a multiuser interference cancellation apparatus for canceling multiuser interference having a plurality of antennas; interference estimation units having a plurality of stages, each interference estimation unit generating and outputting interference replicas and symbol replicas of each user signal from signals respectively received by the plurality of antennas; and computation means for subtracting the interference replicas generated by the interference estimation units in one of the stages from the signals received by the plurality of antennas, and for outputting the subtraction results to the interference estimation units in the following stage, wherein, in each of the interference estimation units in the second and other subsequent stages, each of the symbol replicas transmitted from the interference estimation unit in the preceding stage is converted into antenna signals, residue signals supplied from the computation means are added to the converted antenna signals, and adaptive updating of antenna weights is performed based on the results of this addition.

According to another aspect of the present invention, there is provided a multiuser interference cancellation apparatus for canceling multiuser interference having a plurality of antennas; interference estimation units having a plurality of stages, each interference estimation unit generating and outputting interference replicas and symbol replicas of each user signal from signals respectively received by the plurality of antennas; and computation means for subtracting the interference replicas generated by the interference estimation units in one of the stages from the signals received by the plurality of antennas, and for outputting the subtraction results to the interference estimation units in the following stage, wherein each of the interference estimation units in the second and other subsequent statges comprises conversion means for converting each of the symbol replicas transmitted from the interference estimation unit in the preceding stage into antenna signals, addition means for adding residue signals supplied from the computation means to the antenna signals converted by the conversion means, and adaptive updating means for performing adaptive updating of antenna weights based on the results of the addition performed by the addition means.

Thus, in the multiuser interference cancellation apparatus of the present invention, each of interference estimation units in the second and other subsequent stages multiplies each of the symbol replicas transmitted from the interference estimation unit in the preceding stage by gain-corrected antenna weights to convert each symbol replica into antenna signals. Then, each of these antenna signals and residue signal in correspondence with the antenna signal are added together to regenerate the antenna received signals. Adaptive updating of antenna weights can be performed by using the regenerated antenna received signals even in the second and other subsequent stages.

In the error transmission type of multistage interference canceller, as described above, the antenna received signals are regenerated from residue signals, symbol replicas input to each of the interference estimation units in the second and other subsequent stages and gain-corrected antenna weights, thereby enabling antenna weight adaptive updating in the second and other subsequent stages and making it possible to generate antenna weights with improved accuracy by using the interference-canceled received signals.

DESCRIPTION OF THE PREFERRED EMBODIMENTS

Figure 1:
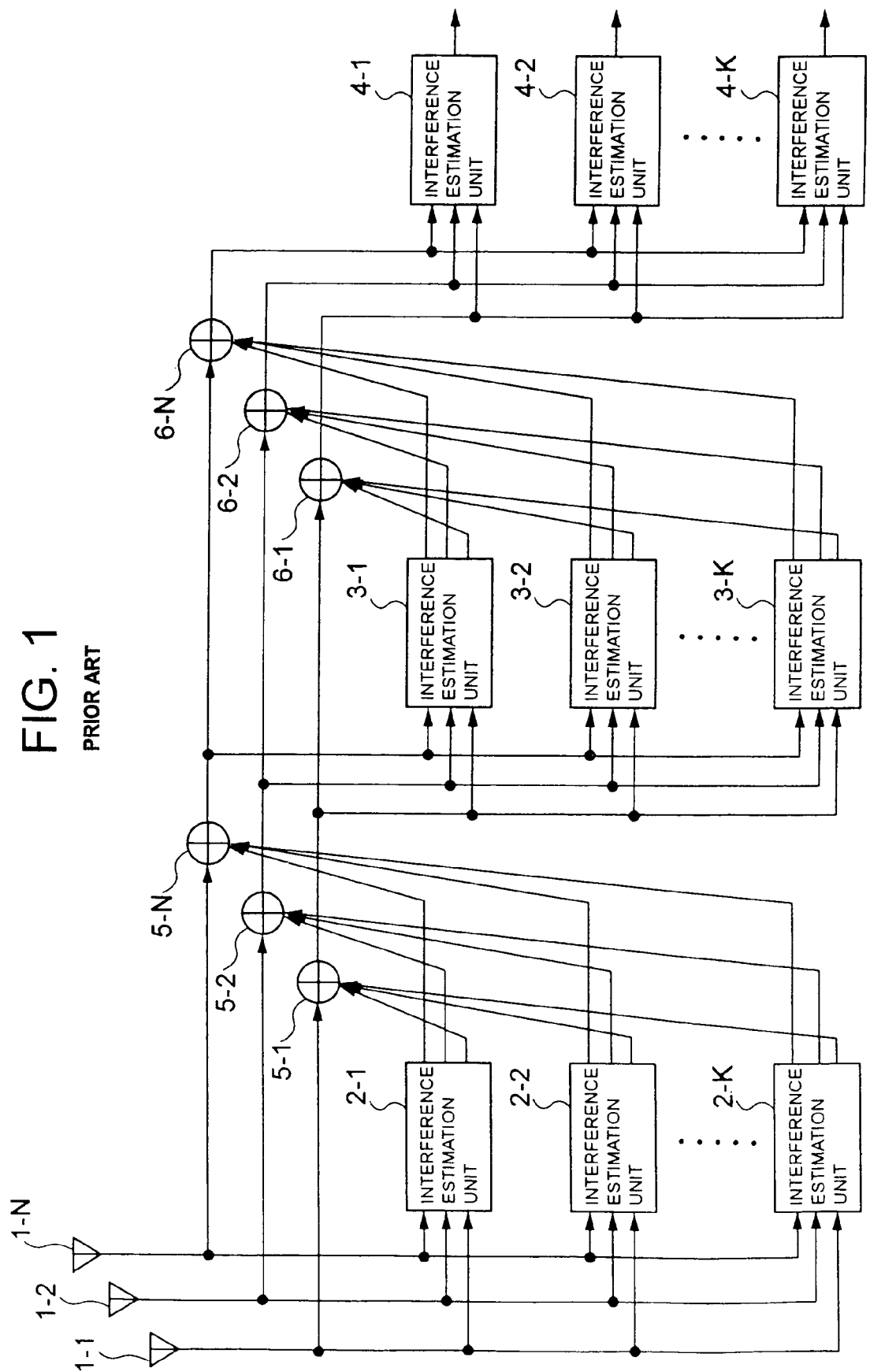
FIG. 1 is a block diagram showing the configuration of a multiuser interference elimination apparatus according to an embodiment of the present invention.

An embodiment of the present invention will be described with reference to the accompanying drawings. FIG. 1 is a block diagram showing the configuration of a multiuser interference elimination apparatus according to an embodiment of the present invention. The multiuser interference elimination apparatus according to the embodiment of the present invention shown in FIG. 1 is characterized in that antenna weights are updated by using adaptive control in each stage.

The multiuser interference elimination apparatus according to the embodiment of the present invention comprises array antennas 1-1 to 1-N, interference estimation units 2-1 to 2-K, 3-1 to 3-K, and 4-1 to 4-K, provided in different stages, and adders 5-1 to 5-N, and 6-1 to 6-N for subtracting interference replicas from antenna received signals or residue signals. N (N: an integer larger than or equal to 1) represents the number of antennas, and K (K: an integer larger than or equal to 1) represents the number of users.

Signals received by the antennas 1-1 to 1-N are input to the interference estimation units 2-1 to 2-K in the first stage. The interference estimation units 2-1 to 2-K output interference replicas and symbol replicas in correspondence with users. The interference replicas are input to the adders 5-1 to 5-N, while the symbol replicas are transmitted to the interference estimation units 3-1 to 3-K in the second stage. The adders 5-1 to 5-N respectively subtract the interference replicas from the antenna received signals in correspondence with the antennas 1-1 to 1-N and output the subtraction results to the interference estimation units 3-1 to 3-K.

The interference estimation units 3-1 to 3-K in the second stage generate interference replicas and symbol replicas and output the interference replicas to the adders 6-1 to 6-N and the symbol replicas to the interference estimation units 4-1 to 4-K in the third stage, as do the interference estimation units 2-1 to 2-K in the first stage. The interference estimation units 4-1 to 4-K in the third stage output demodulated signals.

Figure 2:
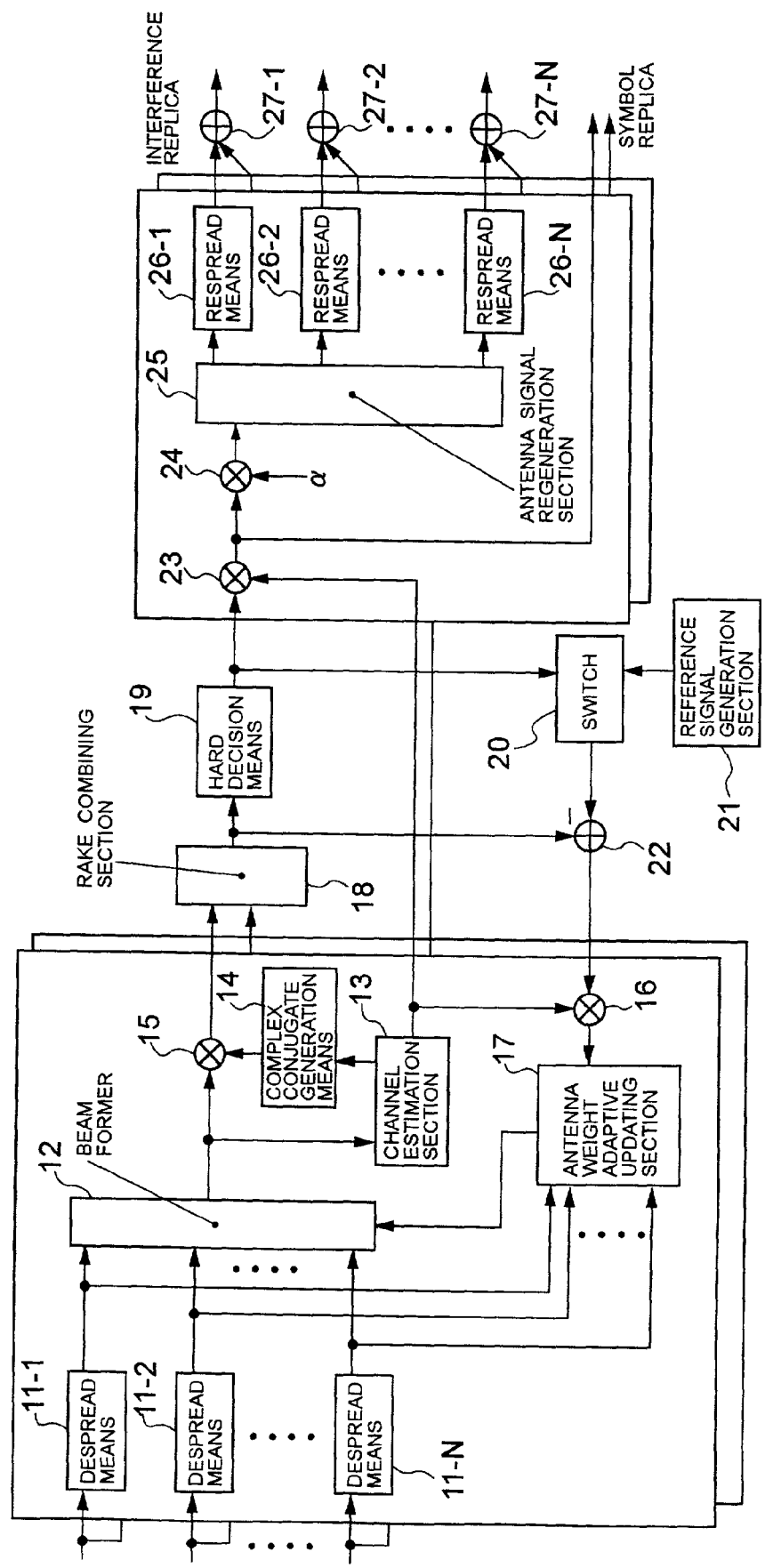
FIG. 2 is a block diagram showing the configuration of an interference estimation unit in the first stage in the apparatus shown in FIG. 1.
Figure 3:
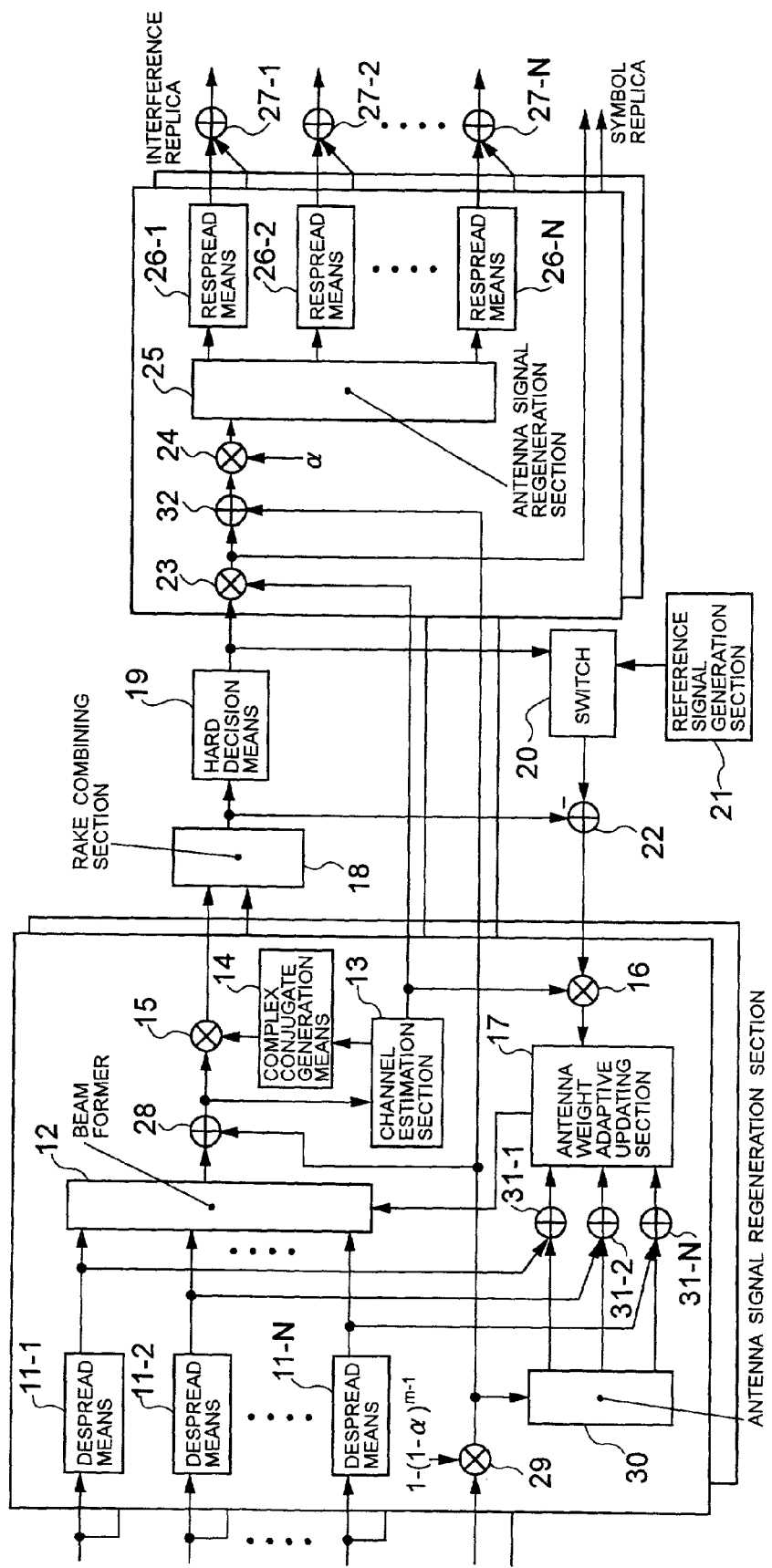
FIG. 3 is a block diagram showing the configuration of an interference estimation unit in the second and other subsequent stages in the apparatus shown in FIG. 1.
Figure 4:
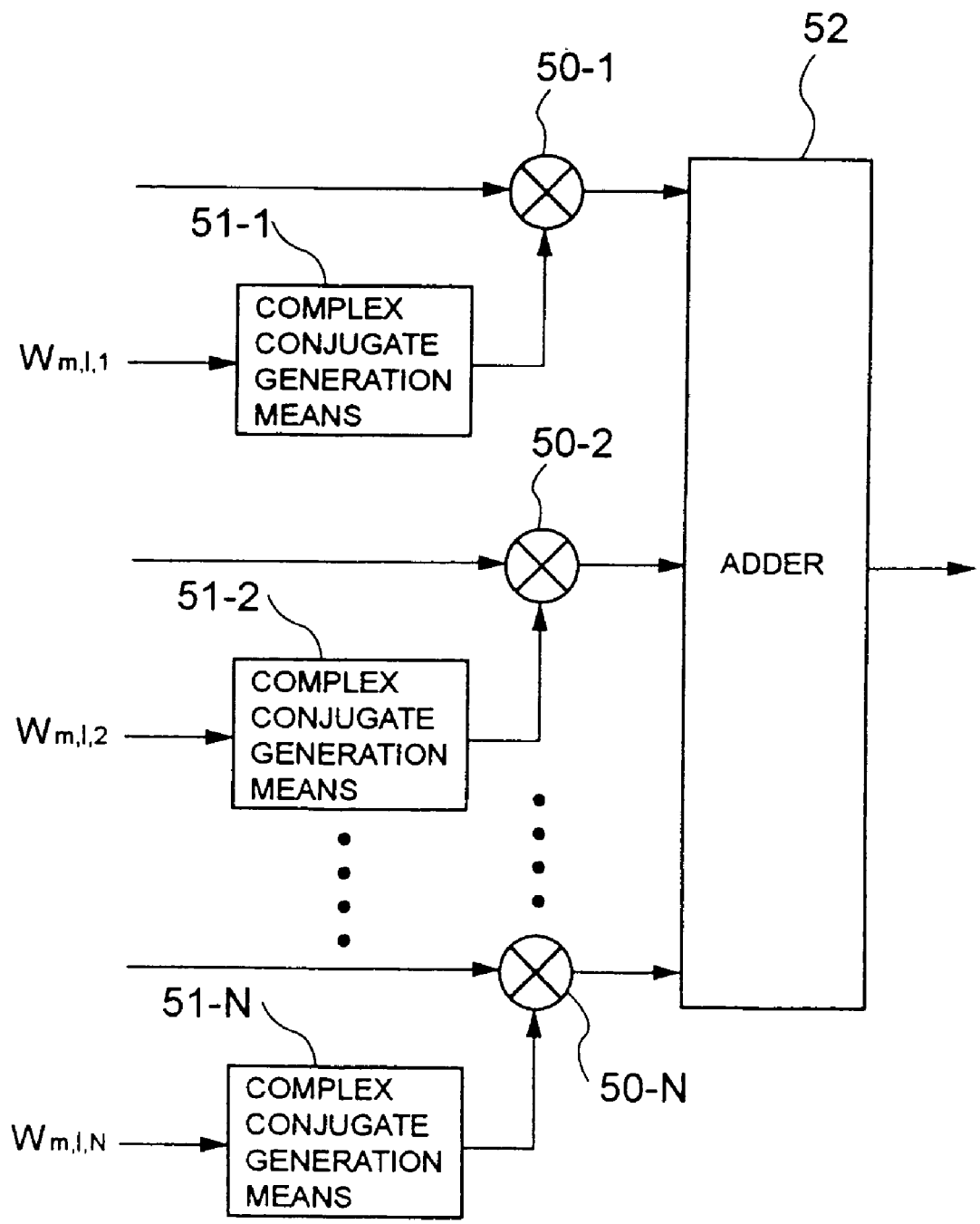
FIG. 4 is a diagram showing details of the configuration of beam formers shown in FIGS. 2 and 3.
Figure 5:
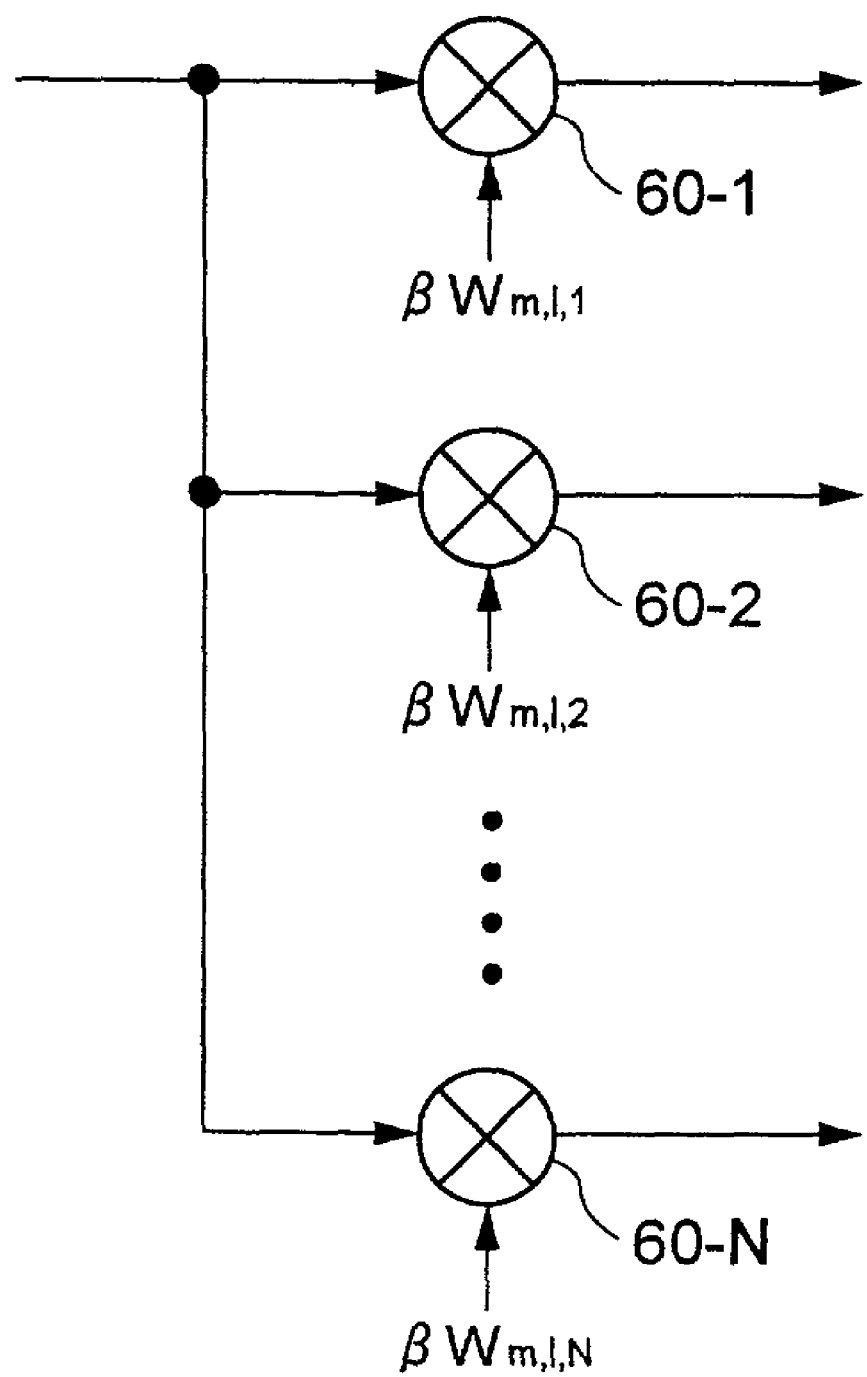
FIG. 5 is a diagram showing details of the configuration of antenna signal regeneration sections shown in FIGS. 2 and 3.
Figure 6:
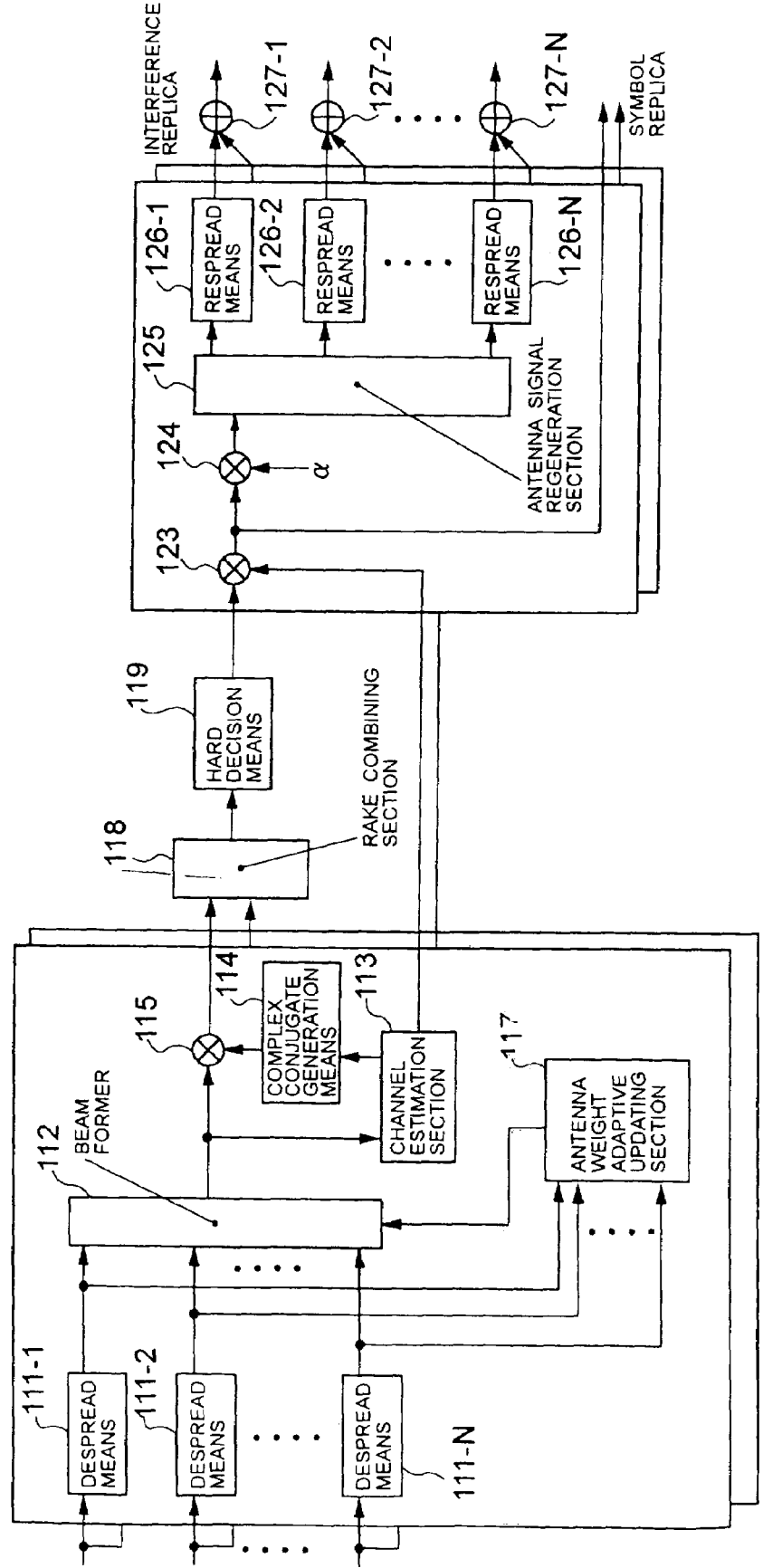
FIG. 6 is a block diagram showing the configuration of an interference estimation unit in a first stage in a conventional arrangement.
Figure 7:
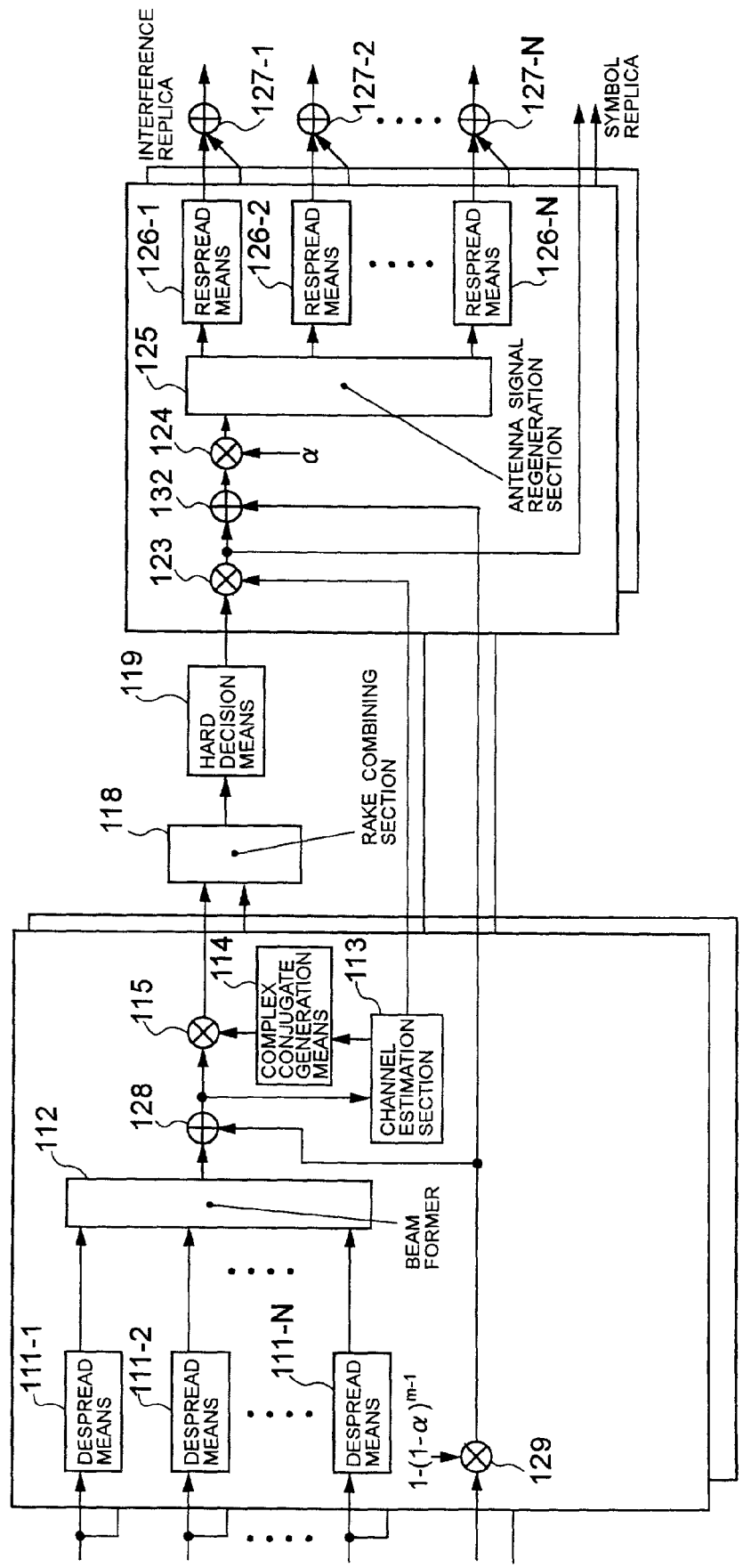
FIG. 7 is a block diagram showing the configuration of an interference estimation unit in second and other subsequent stages in the conventional arrangement.
Figure 8:
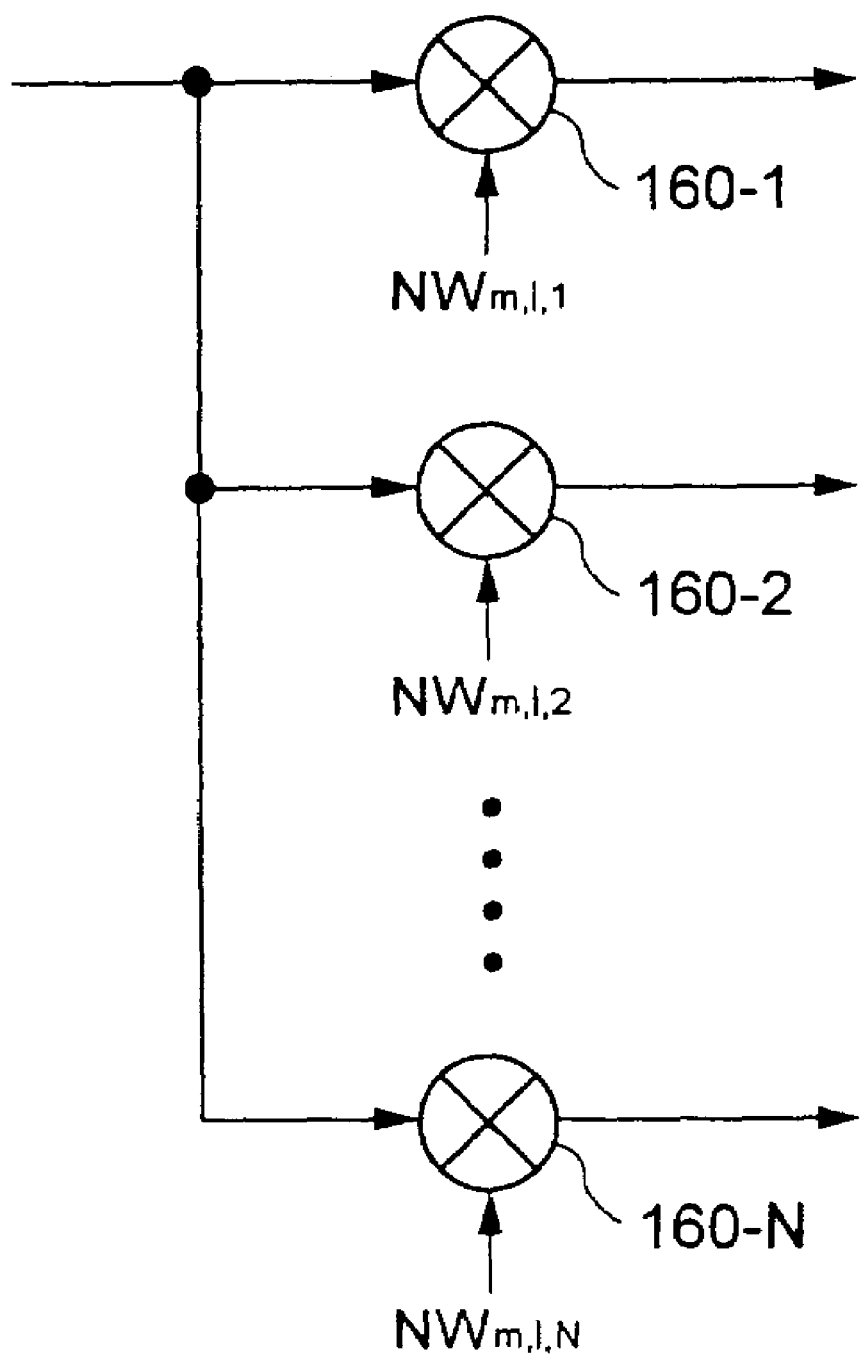
FIG. 8 is a diagram showing details of the configuration of antenna signal regeneration sections shown in FIGS. 6 and 7.

FIG. 2 is a block diagram showing the configuration of each of the interference estimation units 2-1 to 2-K in the first stage shown in FIG. 1; FIG. 3 is a block diagram showing the configuration of each of the interference estimation units 3-1 to 3-K, and 4-1 to 4-K in the subsequent stages shown in FIG. 1; FIG. 4 is a diagram showing details of the configuration of each of beam formers shown in FIGS. 2 and 3; and FIG. 5 is a diagram showing details of the configuration of each of antenna signal regeneration sections shown in FIGS. 2 and 3. The interference estimation units 2-1 to 2-K, 3-1 to 3-K, and 4-1 to 4-K will be described with reference to FIGS. 2 through 5. The interference estimation units 2-1 to 2-K are identical in configuration to each other.

The antenna received signals are despread by despread means 11-1 to 11-N on each RAKE path to be converted into baseband signals. The despread signals are directivity-controlled by a beam former 12. FIG. 4 shows details of the configuration of the beam former 12. Antenna weights are prepared with respect to each stage and each RAKE path. Antenna weights $w_{m,l,1}$ to $w_{m,l,N}$ are prepared with respect to the antenna received signals in the l-th path (l=1 to L) at the m-th stage (m=1 to M). The antenna weights are converted into the respective complex conjugates by complex conjugate generation means 51-1 to 51-N. The complex conjugates of the antenna weights and the antenna signals are multiplied together by multipliers 50-1 to 50-N, the multiplication results are input to an adder 52, and the result of combining by the adder 52 is obtained as an output of the beam former 12.

A channel estimation section 13 estimates a channel distortion from the output from the beam former 12 to obtain a channel estimated value, which is converted into the complex conjugate by a complex conjugate generation means 14. The output from the beam former 12 and the complex conjugate of the channel estimated value are multiplied together by a multiplier 15. The channel distortion is compensated for by multiplication with the complex conjugate value. An output from the multiplier 15 with respect to each RAKE path is input to a RAKE combining section 18. The RAKE combining section 18 generates a demodulated signal (based on the outputs of the multipliers 15) about which a hard decision is made by a hard decision means 19.

On the other hand, the outputs from the despread means 11-1 to 11-N are also input to an antenna weight adaptive updating section 17. When the antenna weight adaptive updating section 17 performs adaptive updating of the antenna weights, a reference signal generation section 21 generates and outputs a known symbol during a training period. After the training period, a switch 20 switches its output from the output of the reference signal generation section 21 to the output of the hard decision means 19, thereby enabling adaptive updating of the antenna weights to be continued.

Accordingly, an error signal used for adaptive updating is obtained in such a manner that an adder 22 subtracts from the demodulated signal the output of the hard decision means 19 or the output of the reference signal generation section 21, and a multiplier 16 multiplies the result of this subtraction by the channel estimated value. The antenna weight adaptive updating section 17 performs adaptive updating of the antenna weights by using the error signal and the antenna received signals, and notifies the beam former 12 of the updated antenna weights. As an adaptive updating algorithm, least mean squared (LMS) or recursive least squared (RLS) is used. The output from the hard decision means 19 is processed with respect to each path in order to generate interference replicas.

A multiplier 23 multiplies the output from the hard decision means 19 by the output from the channel estimation section 13 and transmits a signal obtained as a symbol replica by this multiplication to the following stage. A multiplier 24 multiplies the multiplication result from the multiplier 23 by an interference suppression coefficient α and outputs the result of this multiplication to an antenna signal regeneration section 25. The interference suppression coefficient α is for suppressing the influence of an error in the hard decision result at the time of replica generation to stabilize the interference cancellation operation.

FIG. 5 shows details of the configuration of the antenna signal regeneration section 25. Multipliers 60-1 to 60-N of the antenna signal regeneration section 25 regenerate antenna signals by multiplying the input signal by coefficients which are obtained by multiplying the antenna weights $w_{m,l,1}$ to $W_{m,1,N}$ by an antenna gain correction coefficient β. The signals obtained as antenna signals by conversion in the antenna signal regeneration section 25 are respread by respread means 26-1 to 25-N in correspondence with the antennas 1-1 to 1-N. Each of adders 27-1 to 27-N adds together the input antenna signals to generate an interference replica.

The interference estimation units 3-1 to 3-K will be described with reference to FIG. 3. In the arrangement shown in FIG. 3, components identical or corresponding to those shown in FIG. 2 are indicated by the same reference characters. Symbol replicas transmitted from the interference estimation units 2-1 to 2-K in the first stage and residue signals output from the adders 5-1 to 5-N shown in FIG. 1 are input to the interference estimation units 3-1 to 3-K in the second stage. The residue signals are despread by despread means 11-1 to 11-N and directivity-controlled by a beam former 12.

An adder 28 adds together an output from the beam former 12 and the results of multiplication performed by a multiplier 29, i.e., multiplication of the symbol replica transmitted from the preceding stage by a coefficient determined by the interference suppression coefficient α and the stage number m. A channel estimation section 13 obtains a channel estimated value from an output of the adder 28. A complex conjugate generation means 14 converts the channel estimated value from the channel estimation section 13 into the complex conjugate. A multiplier 15 multiplies together the output from the beam former 12 and the complex conjugate value obtained by the complex conjugate generation means 14, and outputs the result of this multiplication to a RAKE combining section 18.

The RAKE combining section 18 combines outputs from the multipliers 15 obtained in correspondence with RAKE paths to obtain a demodulated signal. The same error signal as the above-described error signal in each of the interference estimation units 2-1 to 2-N in the first stage is input to an antenna weight adaptive updating section 17. The description for the error signal will not be repeated. The symbol replica multiplied by the coefficient $[1-(1-\alpha)^{m-1}]$ (determined by the interference suppression coefficient α and the stage number m) by the multiplier 29 is converted into antenna signals by an antenna signal regeneration section 30. These antenna signals and outputs from the despread means 11-1 to 11-N are added together by adders 31-1 to 31-N. Outputs from the adders 31-1 to 31-N are input as the antenna received signals to the antenna weight adaptive updating section 17.

On the other hand, an output from a hard decision means 19 and the channel estimated value output from the channel estimation section 13 are multiplied together by a multiplier 23 and the result of this multiplication is transmitted as a symbol replica to the following stage. This operation is the same as that in each of the above-described interference estimation units 2-1 to 2-N in the first stage. An adder 32 subtracts the symbol replica transmitted from the preceding stage from the symbol replica output at the present time from the multiplier 23. A multiplier 24 multiplies the symbol replica difference output from the adder 32 by the interference suppression coefficient α. An antenna signal regeneration section 25 converts an output from the multiplier 24 into antenna signals. Respread means 26-1 to 26-N respread the antenna signals obtained by conversion in the antenna signal regeneration section 25. Each of adders 27-1 to 27-N adds together the input antenna signals to generate an intereference replica. The adders 27-1 to 27-N transmit the interference replicas to the adders 6-1 to 6-N shown in FIG. 1.

The interference estimation units 4-1 to 4-K in the third stage have substantially the same configuration as that of the interference estimation units 3-1 to 3-K in the second stage. However, each of the interference estimation units 4-1 to 4-K outputs as a demodulated signal the output from the RAKE combining section 18 shown in FIG. 3 while generating no interference replica and no symbol replica. The method of obtaining the output from the RAKE combining section 18 is the same as that for the interference estimation units 3-1 to 3-K in the second stage. The same description for it will not be repeated. While the number of stages in the above-described configuration is limited to three for ease of description, four or more stages may also be provided and the operation of the second stage may be repeated a certain number of times.

In the multiuser interference cancellation apparatus according to the embodiment of the present invention, antenna residue signals and symbol replicas are input to the interference estimation units 3-1 to 3-K, 4-1 to 4-K in the second and other subsequent stages. Since each symbol replica is added to the output from the beam former 12, the desired signals are not contained in the antenna signals input to the beam former 12 and adaptive updating of antenna weights cannot be performed by using these antenna signals.

Then, the symbol replica transmitted from the preceding stage and multiplied by $[1-(1-\alpha)^{m-1}]$ by the multiplier 29 is converted into antenna signals by the antenna signal regeneration section 30, and these antenna signals are added to the outputs from the despread means 11-1 to 11-N by the adders 31-1 to 31-N, thereby regenerating the antenna received signals. Antenna weight adaptive updating is performed by using these antenna received signals.

Regeneration of the antenna received signals may be performed with respect to control signal used for adaptive updating and is not required for processing of data signals, so that the increase in the amount of computation due to regeneration of the antenna received signals is small. Also, since the beam gain (peak) of the antenna weight updated by adaptive updating is not always set equal to 1, the input signal is multiplied by the antenna weight and the antenna gain correction coefficient β in each of the antenna signal regeneration sections 25 and 30 to regenerate antenna signals accurate in level. The antenna gain correction coefficient β is given as shown by $\beta=N/g^2$ if the beam former 12 has a gain represented by g.

In control for directing the beam based on incoming direction estimation used in conventional multiuser interference elimination apparatus, the beam gain (peak) can be normalized to 1 and therefore β=N may always be selected. The present invention also comprises such antenna weight control performed in each stage.

Thus, in the error transmission type of multistage interference canceller, the antenna received signals are regenerated from residue signals, symbol replicas input to each of the interference estimation units in the second and other subsequent stages and gain-corrected antenna weights, thereby enabling antenna weight adaptive updating in the second and other subsequent stages and making it possible to generate antenna weights with improved accuracy by using the interference-canceled signals.

According to the present invention, as described above, a multiuser interference cancellation apparatus is provided which has a plurality of antennas; interference estimation units having a plurality of stages, each interference estimation unit generating and outputting interference replicas and symbol replicas of each user signal from signals respectively received by the plurality of antennas; and computation means for subtracting the interference replicas generated by the interference estimation units in one of the stages from the signals received by the plurality of antennas, and for outputting the subtraction results to the interference estimation units in the following stage. In each of interference estimation units in the second and other subsequent stages of this apparatus, each of the symbol replicas transmitted from the interference estimation unit in the preceding stage is converted into antenna signals, residue signals supplied from the computation means are added to the converted antenna signals, and adaptive updating of antenna weights is performed based on the results of this addition, thus enabling antenna weight adaptive updating even in the second and other subsequent stages and making it possible to generate antenna weights with improved accuracy by using the interference-canceled received signals.

What is claimed is:

1. A multiuser interference cancellation apparatus for canceling multiuser interference, comprising:
    a plurality of antennas;
    interference estimation units having a plurality of stages, each interference estimation unit generating and outputting interference replicas and symbol replicas of each user signal from signals respectively received by said plurality of antennas; and
    computation means for subtracting the interference replicas generated by the interference estimation units in one of the stages from the signals received by said plurality of antennas, and for outputting the subtraction results to the interference estimation units in the following stage,
    wherein, in each of the interference estimation units in the second and other subsequent stages, each of the symbol replicas transmitted from the interference estimation unit in the preceding stage is converted into antenna signals, residue signals supplied from the computation means are added to the converted antenna signals, and adaptive updating of antenna weights is performed based on the results of this addition.

2. The multiuser interference cancellation apparatus according to claim 1, wherein, in the conversion into the antenna signals, each of the symbol replicas transmitted from the interference estimation unit in the preceding stage and multiplied by a coefficient determined by an interference suppression coefficient and the stage number is converted into the antenna signals.

3. The multiuser interference cancellation apparatus according to claim 1, wherein, in the conversion into the antenna signals, each of the symbol replicas transmitted from the interference estimation unit in the preceding stage is multiplied by gain-corrected antenna weights to be converted into the antenna signals.

4. The multiuser interference cancellation apparatus according to claim 1, wherein the antenna weights are used for control of directivity of signals obtained by despreading the signals received by said plurality of antennas.

5. A multiuser interference cancellation apparatus for canceling multiuser interference, comprising:
    a plurality of antennas;
    interference estimation units having a plurality of stages, each interference estimation unit generating and outputting interference replicas and symbol replicas of each user signal from signals respectively received by said plurality of antennas; and
    computation means for subtracting the interference replicas generated by the interference estimation units in one of the stages from the signals received by said plurality of antennas, and for outputting the subtraction results to the interference estimation units in the following stage,
    wherein each of the interference estimation units in the second and other subsequent stages comprises:
    conversion means for converting each of the symbol replicas transmitted from the interference estimation unit in the preceding stage into antenna signals;
    addition means for adding residue signals supplied from the computation means to the antenna signals converted by said conversion means; and
    adaptive updating means for performing adaptive updating of antenna weights based on the results of the addition performed by said addition means.

6. The multiuser interference cancellation apparatus according to claim 5, wherein said conversion means converts into the antenna signals each of the symbol replicas transmitted from the interference estimation unit in the preceding stage and multiplied by a coefficient determined by an interference suppression coefficient and the stage number.

7. The multiuser interference cancellation apparatus according to claim 5, wherein said conversion means multiplies each of the symbol replicas transmitted from the interference estimation unit in the preceding stage by gain-corrected antenna weights to convert into the antenna signals.

8. The multiuser interference cancellation apparatus according to claim 5, wherein the antenna weights are used for control of directivity of signals obtained by despreading the signals received by said plurality of antennas.

9. The multiuser interference cancellation apparatus according to claim 5, wherein said antenna signal regeneration section converts into the antenna signals each of the symbol replicas transmitted from the interference estimation unit in the preceding stage and multiplied by a coefficient determined by an interference suppression coefficient and the stage number.

10. The multiuser interference cancellation apparatus according to claim 5, wherein said antenna signal regeneration section multiplies each of the symbol replicas transmitted from the interference estimation unit in the preceding stage by gain-corrected antenna weights to convert into the antenna signals.

11. The multiuser interference cancellation apparatus according to claim 5, wherein the antenna weights are used for control of directivity of signals obtained by despreading the signals received by said plurality of antennas.

12. A multiuser interference cancellation apparatus for canceling multiuser interference, comprising:

a plurality of antennas;

interference estimation units having a plurality of stages, each interference estimation unit generating and outputting interference replicas and symbol replicas of each user signal from signals respectively received by said plurality of antennas; and first adders that subtract the interference replicas generated by the interference estimation units in one of the stages from the signals received by said plurality of antennas, and output the subtraction results to the interference estimation units in the following stage, wherein each of the interference estimation units in the second and other subsequent stages comprises:

an antenna signal regeneration section that converts each of the symbol replicas transmitted from the interference estimation unit in the preceding stage into antenna signals;

second adders that add residue signals supplied from the antenna signal first adders to the antenna signals converted by the antenna signal regeneration section; and an adaptive update section that performs adaptive updating of antenna weights based on the results of the addition performed by said second adders.

* * * * *